United States Patent
Nerone et al.

(10) Patent No.: US 6,794,827 B2
(45) Date of Patent: Sep. 21, 2004

(54) MULTIPLE BALLASTS OPERABLE FROM A SINGLE DC BUS

(75) Inventors: Louis R. Nerone, Brecksville, OH (US); Joseph C. Oberle, Chagrin Falls, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/247,798

(22) Filed: Sep. 19, 2002

(65) Prior Publication Data

US 2003/0094908 A1 May 22, 2003

Related U.S. Application Data

(60) Provisional application No. 60/323,447, filed on Sep. 19, 2001.

(51) Int. Cl.$^7$ ............................................... H05B 37/02
(52) U.S. Cl. ................... 315/224; 315/209 R; 315/246; 315/287; 315/291
(58) Field of Search ............................. 315/224, 209 R, 315/246, 287, 291, 274, 276, 307, 225, 184, 200 R, 247, 312, 324

(56) References Cited

U.S. PATENT DOCUMENTS

| | | | |
|---|---|---|---|
| 3,969,652 A | 7/1976 | Herzog ........................ | 315/224 |
| 5,729,096 A | 3/1998 | Liu et al. ...................... | 315/225 |
| 5,770,925 A | 6/1998 | Konopka et al. ............ | 315/225 |
| 5,869,935 A | 2/1999 | Sodhi .......................... | 315/225 |
| 5,945,788 A | 8/1999 | Li et al. ....................... | 315/308 |
| 6,160,358 A * | 12/2000 | Moisin ......................... | 315/291 |
| 6,246,182 B1 * | 6/2001 | Yamasaki et al. ......... | 315/209 R |
| 6,320,329 B1 * | 11/2001 | Wacyk ........................ | 315/291 |
| 6,392,367 B1 * | 5/2002 | Heike et al. ................ | 315/291 |
| 6,424,098 B1 * | 7/2002 | Beland et al. .............. | 315/224 |
| 6,515,431 B2 | 2/2003 | Moo et al. .................. | 315/224 |

* cited by examiner

Primary Examiner—Tuyet T. Vo
(74) Attorney, Agent, or Firm—Fay, Sharpe, Fagan, Minnich & McKee, LLP

(57) ABSTRACT

A plurality of lighting ballasts (12, 14, 16) draw power from a single DC bus signal. A power factor correction circuit (10) rectifies and smoothes AC power to produce the DC bus signal. In order to prevent damage to the ballast (12) when a lamp (18) dies or is removed, the ballast (12) includes an AC switch that senses damaging conditions and responds by changing a resonant frequency of the ballast (12). The AC switch operates in 2–3 second cycles. While it is operative, it shunts current away from inductors (38, 40) of the ballast (12) causing a resonant frequency of the ballast (12) to change. At the end of the cycle, the switch turns off, but if a load fault is still present in the ballast (12) it activates again. Preferably, the AC switch has a response time of approximately 500 µs.

11 Claims, 3 Drawing Sheets

US 6,794,827 B2

MULTIPLE BALLASTS OPERABLE FROM A SINGLE DC BUS

This application claims benefit of 60/323,447 filed Sep. 19, 2001.

BACKGROUND OF THE INVENTION

The present invention relates to the artificial illumination arts. It finds particular application in protecting lamp ballasts from open circuit load faults and will be described with particular reference thereto. It is to be appreciated, however, that the present invention is also applicable to protecting vital components of other circuits from voltage and current surges, and is not limited to the aforementioned application.

Often, it is desirable to operate fluorescent lamps independently of each other. In many existing systems, if one lamp fails, others will also cease to function. To aid in the re-lamping process, it is desirable to have all functioning lamps operating, so that a repairman can easily discern which lamps need to be replaced. Also, it is easier for the repairman to work if he has light from adjacent lamps to aid him.

When a lamp fails, or is outright removed from the circuit while the ballast is in operation, open circuit voltages can become so high as to damage sensitive circuit components, rendering the ballast useless for further lighting applications. However in order to replace the lamp while other lamps are in operation, it is necessary to remove the lamp while power is being supplied to the ballast.

Often, ballast circuits include a plurality of transistors, such as bi-polar junction transistors, (BJTs), for switching purposes. These devices were not meant to handle high current applications. In existing ballasts, an open circuit load fault causes greatly increased current flow. With such current flowing through the BJTs, they become highly dissipative, generating heat, which damages or destroys the BJTs and other components.

BRIEF DESCRIPTION OF THE INVENTION

In accordance with one aspect of the present invention, a lighting system powered by an alternating current source is provided. A power factor correction circuit creates a direct current bus signal, which is used to power at least two lamp ballasts. The ballasts include an alternating current switch that protects circuit components when the lamp is removed or fails to ignite.

In accordance with another aspect of the present invention, a method of illumination is provided. A direct current bus signal is created by rectifying an alternating current signal with a power factor correction circuit, from which at least two lamp ballasts are supplied power.

In accordance with another aspect of the present invention, a lighting system that includes an alternating current switch is provided. First and second field effect transistors draw current away from the ballast. An inductive tap provides the alternating current switch with power, reverse-biasing the gates of the transistors. First and second charge pumps store charge from the inductive tap.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
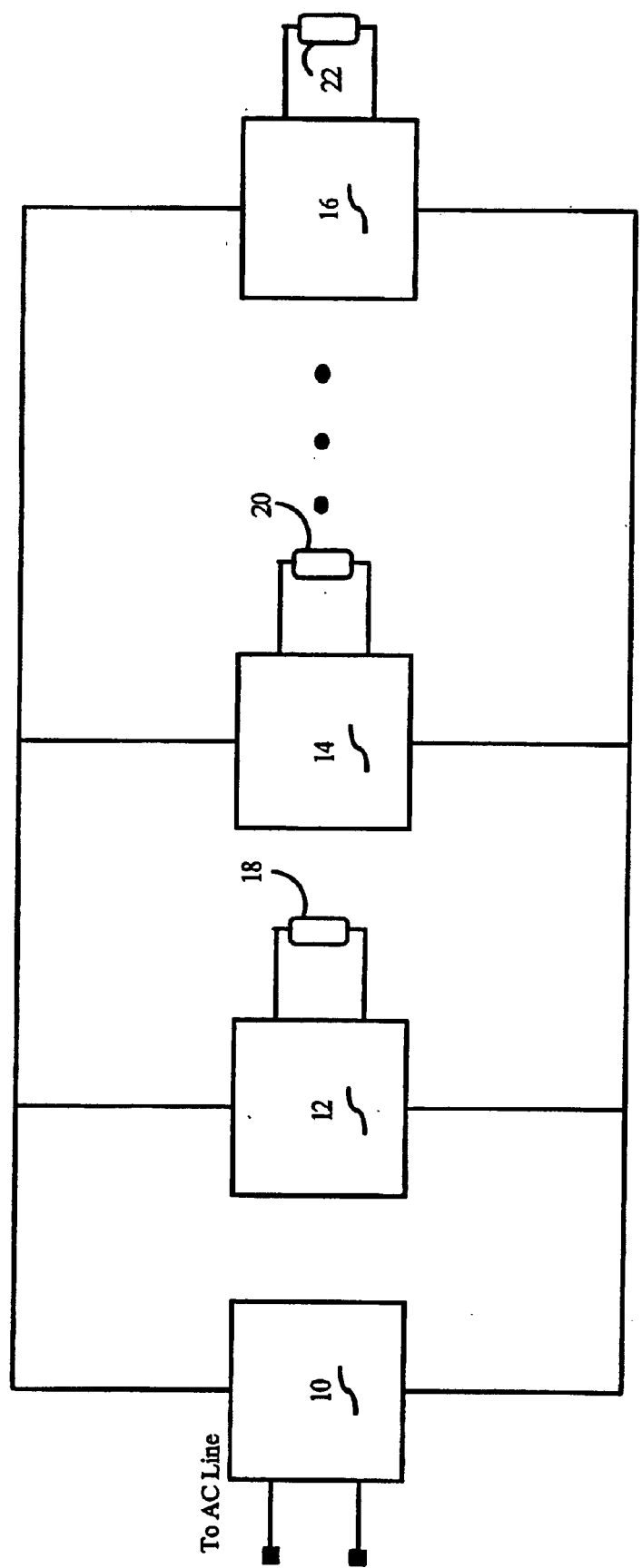
FIG. 1 is a diagrammatic illustration of a lighting system including multiple lamp ballasts operating off of a direct current bus, in accordance with the present invention.

With reference to FIG. 1, a power factor correction circuit 10 is connected to an alternating current (AC) power source. The power factor correction circuit 10 includes rectifying and smoothing components, as are well known in the art, to convert the AC signal into a direct current (DC) bus signal. A plurality of lamp ballasts 12, 14, 16 are connected in parallel to the power factor correction circuit. It is to be understood that any number of ballasts may draw power from the DC bus, to a capacity of the AC source. Associated with each ballast is a lamp 18, 20, 22. In the preferred embodiment, the ballasts 12, 14, 16 are independently operable. Though they draw power from the same source, any combination of lamps 18, 20, 22 may be lit at any given time. Preferred control methods include wall switch controls, RF remote control, audible/voice recognition control, and others.

Preferably, each ballast operates at a distinct resonance frequency. That is, there is a single frequency or small range of frequencies at which the ballast circuit will light the lamp. Some ballasts are selected to have broad ranges of operating frequencies, and some have relatively narrow ranges. Knowing the respective frequency ranges and the overlap among the ballasts allows a frequency to be selected that lights the desired lamps.

Figure 2:
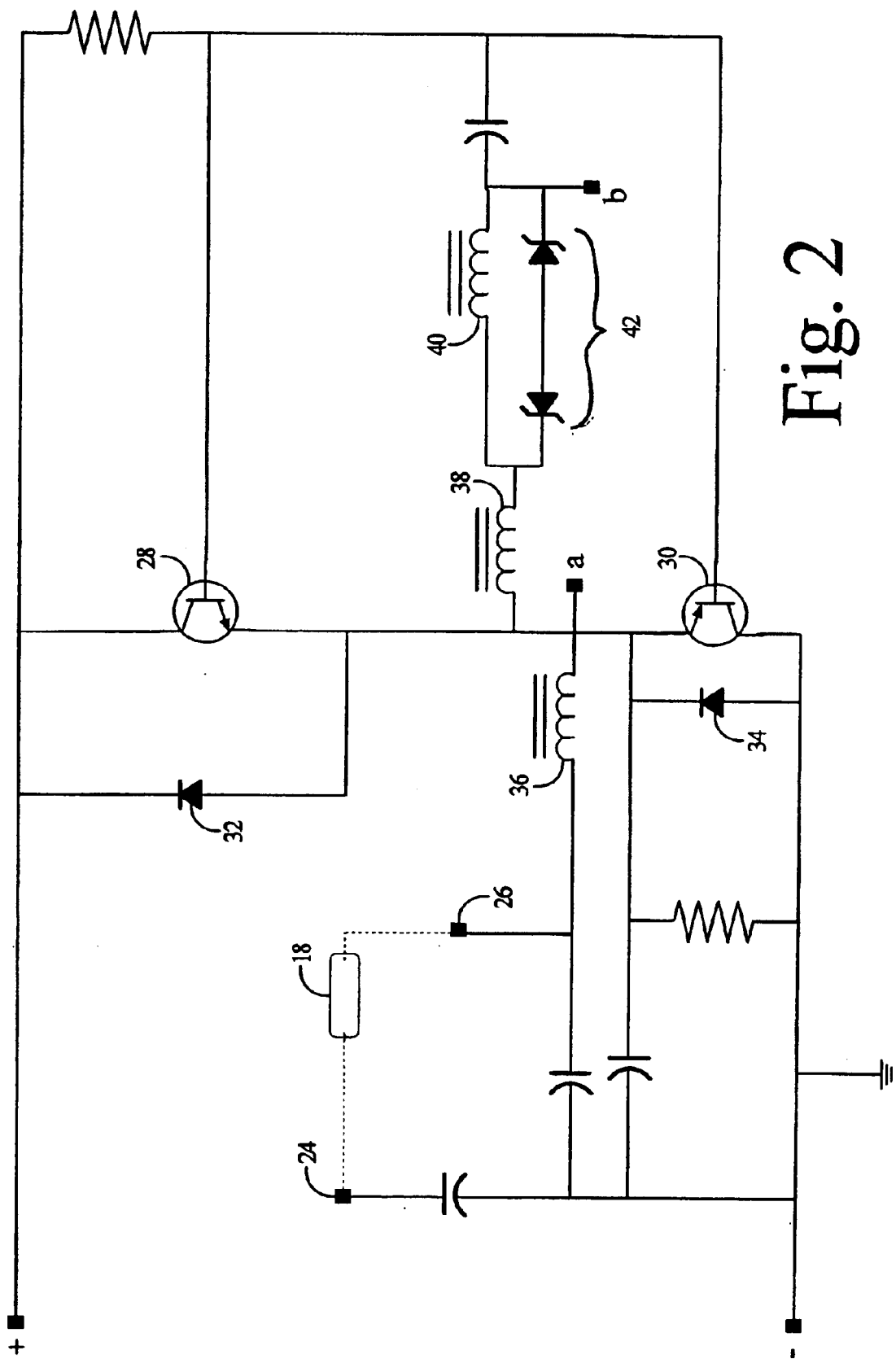
FIG. 2 is a circuit diagram of a lamp ballast circuit, in accordance with the present invention.

With reference to FIG. 2, in a preferred embodiment of the ballast circuit, the lamp 18 is connected between external contacts 24, 26. Should the lamp 18 be removed from the circuit, or fail to ignite, the area between points 24 and 26 looks open to the rest of the circuit. With no load lamp present in the ballast, the remainder of the circuit is overdriven, which results in increased current flow to bi-polar junction transistors (BJTs) 28, 30 which can overload the BJTs and damage them to a point where the circuit is useless. Diodes 32, 34 are present to help prevent reverse current flow through the BJTs.

As briefly stated previously, the ballast operates at a certain frequency or range of frequencies. The resonant frequency of the ballast, that is, the frequency at which the ballast yields optimal performance, is defined by a set of inductors 36, 38, 40. In the preferred embodiment, an AC switch is connected between points a and b. When activated, the AC switch creates a short between points a and b, thereby bypassing the inductors 38 and 40, which help to define the resonant frequency of the ballast. When the short is inserted by the AC switch, the inductor 36 defines the resonant frequency. The new resonant frequency is preferably substantially different than the previous resonant frequency, also preferably substantially different than the operating frequency of the DC bus. This drastically reduces the current flow and voltage drop across the ballast to a point where damage to the BJTs 28, 30 will not occur. Every two to three seconds, the switch opens again, introducing the inductors 38, 40 back into the ballast circuit. If the lamp 18 is not present or is not functioning, the switch shorts out the inductors 38, 40 again, repeating the cycle until an operating lamp is present between contacts 24 and 26. Back to back Zener diodes 42 clamp the voltage across the inductor 40.

Figure 3:
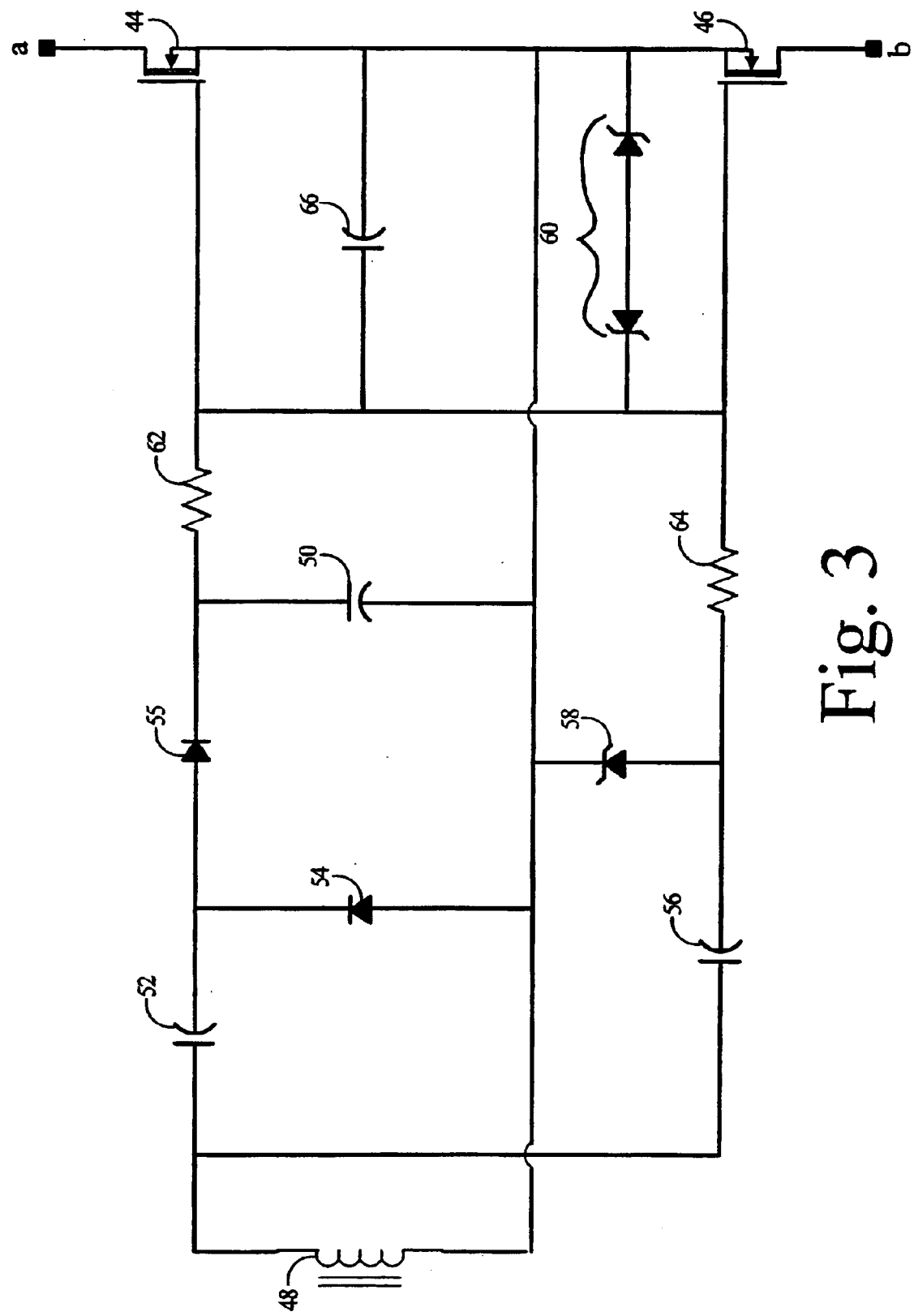
FIG. 3 is a circuit diagram of an alternating current switch incorporated into the ballast circuit, in accordance with the present invention.

With reference to FIG. 3 the AC switch includes a pair of metal oxide semi-conducting field effect transistors (MOSFETs) 44, 46. It is to be understood that other transistor types, such as IGFETs, JFETs, or BJTs, all of either the p or n junction variety can also be used. When turned conductive, the MOSFETs 44, 46 provide a current shunt away from the inductors 38, 40, that is, they provide a direct short between points a and b. In order for the MOSFETs 44, 46 to turn conductive, a positive voltage must be applied to the gate of each MOSFET. An inductive tap 48 provides voltage for the AC switch. The inductive tap 48 is a transformer winding in which current is induced by the inductor 36. There is a large voltage difference between the voltage across the inductor 36 when the lamp 18 is engaged and when it is disengaged. Macroscopically, the AC switch senses the difference and activates, thereby protecting the ballast circuit.

During normal operation of the ballast circuit, i.e., when the lamp is engaged and functioning, the inductive tap 48 causes a reverse bias on the gates of the MOSFETs 44, 46, holding them non-conductive. In one preferred embodiment, the reverse bias is approximately ten volts below ground. The reverse bias is to ensure that the MOSFETs 44, 46 do not activate when the lamp 18 is operating normally. If the lamp is removed from the circuit, the voltage across the inductor 36 rises. Thus, the voltage produced by the inductive tap 48 likewise rises. This rise in voltage production initiates upper and lower charge pumps to store charge.

The upper charge pump includes a capacitor 50 that stores charge to overcome the reverse bias applied to the gates of the MOSFETs 44, 46. In one embodiment, this capacitor is a 1 $\mu$F capacitor. During one-half cycle of the AC switch, the inductive tap charges capacitor 50. During the next half cycle, the inductive tap 48 charges a second capacitor 52 of the first charge pump. This capacitor may for example be a 47 nF capacitor. During the third half cycle, the inductive tap 48 once again charges the 1 $\mu$F capacitor 50 and the 47 nF capacitor 52 discharges, aiding in the charging of the capacitor 50. Over several charging cycles, capacitor 50 accumulates sufficient charge to overcome the reverse bias on the gates. Diodes 54, 55 in the first charge pump direct current to aid in the charging of the capacitor 50.

Once a forward bias is applied to the gates, that is, once the threshold voltage has been reached, the MOSFETS 44, 46 turn conductive. As previously discussed, this shorts the inductors 38 and 40, changing the resonant frequency of the ballast circuit, cutting the voltage and current through the circuit. As a result, a significantly lower voltage crosses the inductor 36, and consequently, significantly less voltage is transferred to the inductive tap 48, virtually eliminating the reverse bias on the gates. This means, although the 1 $\mu$F capacitor had to accumulate enough charge to overcome the threshold voltage, it has to almost fully discharge before the MOSFETs 44, 46 again become non-conductive. Utilizing the preferred component values, the 1 $\mu$F capacitor 50 takes approximately 500 $\mu$s to charge to the threshold voltage, and approximately two to three seconds to discharge.

When MOSFETs 44, 46 again become non-conductive, the resonant frequency of the ballast is re-defined back to its operating value. If the lamp 18 is still not functional, the cycle repeats until the lamp 18 is replaced. If the lamp is functional, the ballast resumes steady state operation with the AC switch off.

The lower charge pump includes a capacitor 56 and a Zener diode 58. The capacitor 56 is in parallel with the capacitor 52, with respect to the inductive tap 48. Similar to the capacitor 52, the capacitor 56 helps to charge the 1 $\mu$F capacitor 50.

In the time period when the 1 $\mu$F capacitor 50 is charging, relatively high voltages and currents are present within the AC switch. To protect the MOSFETs, back to back Zener diodes 60 clamp the voltage to a safe potential, while resistors 62, 64 lessen the current to the MOSFETs. Preferably, and with specific reference to FIG. 3, the resistor on the top rail 62 is nominally 510 k$\Omega$ and the resistor on the bottom rail 64 is 270 k$\Omega$. Also included in the AC switch is a capacitor 66 that helps to hold the reverse bias on the gates during steady state operation. In the present embodiment, the capacitor 66 is a 1 nF capacitor.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A lighting system powered by an alternating current source, the system comprising:
    a power factor correction circuit for rectifying and smoothing a voltage signal from the alternating current source creating a direct current bus signal;
    a first ballast;
    a first alternating current switch in operational connection to the first ballast that prevents damage to the first ballast when a light source is at least one of a) removed from the first ballast, and b) failing to arc, the first alternating current switch comprising;
        first and second field effect transistors that when conductive, draw current away from the first ballast;
        a first inductive tap that supplies power to the first alternating current switch and reverse-biases gates of the first and second field effect transistors;
        first and second charge pumps which store charge from the first inductive tap;
    a second ballast in a parallel circuit relationship with the first ballast;
    a second alternating current switch in operational connection to the second ballast that prevents damage to the second ballast when a light source is at least one of a) removed from the second ballast, and b) failing to arc, the second alternating current switch comprising:
        third and fourth field effect transistors that when conductive, draw current away from the second ballast;
        a second inductive tap that supplies power to the second alternating current switch and reverse-biases gates of the third and fourth field effect transistors;
        third and fourth charge pumps which store charge from the second inductive tap; and,
    wherein the first and second ballasts are operable independently of one another.

2. The lighting system as set forth in claim 1, wherein the parallel circuit relationship of the first and second ballasts allow both the first and second ballasts allow both the first and second ballasts to be powered by the direct current bus.

3. The lighting system as set forth in claim 1, wherein first lamp ballast includes a first range of resonant frequencies, and the second ballast includes a second range of resonant frequencies, the first and second ranges including at least a portion of common frequencies.

4. The lighting system as set forth in claim 1, wherein the first and second ballasts operate at different frequencies.

5. A lighting system powered by an alternating current source, the system comprising:
   a power factor correction circuit for converting alternating current into direct current;
   at least two ballasts, each ballast containing an alternating current switch, the switch comprising
      first and second field effect transistors that when conductive, draw current away from the ballast;
      an inductive tap that supplies power to the alternating current switch and reverse-biases gates of the field effect transistors;
      first and second charge pumps which stem charge from the inductive tap.

6. The lighting system as set forth in claim 5, further including:
   resistors that limit current applied to drains of the transistors.

7. The lighting system as set forth in claim 5, wherein the alternating switch includes:
   a first capacitance that stores charge to overcome the reverse bias applied to the gates of the transistors;
   a second capacitance that helps to charge the first capacitance.

8. The lighting system as set forth in claim 7, wherein the first capacitance supplies a threshold voltage to the gates of the transistors, turning them conductive, causing the inductive tap to shut off, temporarily eliminating the reverse bias on the gates of the transistors, and the first capacitance discharges, no longer supplying the necessary threshold voltage turning the inductive tap on, re-applying the bias voltage to the gates, turning the transistors non-conductive and recharging the first and second capacitances.

9. The lighting system as set forth in claim 8, wherein the first capacitance has a discharge time of two to three seconds, during which time the reverse bias has been removed, at the end of which time the reverse bias is re-applied.

10. The lighting system as set forth in claim 9, further including:
   at least one Zener diode that prevents damaging voltages from reaching the gates of the transistors.

11. A method of illumination comprising:
   converting alternating current into direct current to power at least two ballasts, each ballast containing an alternating current switch;
   the switch performing the steps of:
      drawing current away from the ballast with conductive first and second field effect transistors;
      supplying power to the first and second field effect transistors and reverse-biasing gates of the field effect transistors with an inductive tap;
      storing charge from the inductive tap with first and second charge pumps.

* * * * *